(12) United States Patent
Alnabulsi

(10) Patent No.: US 11,218,225 B1
(45) Date of Patent: Jan. 4, 2022

(54) ANALOG RECEIVER EQUALIZER ARCHITECTURES FOR HIGH-SPEED WIRELINE AND OPTICAL APPLICATIONS

(71) Applicant: MARVELL ASIA PTE, LTD., Singapore (SG)

(72) Inventor: Basel Alnabulsi, San Jose, CA (US)

(73) Assignee: MARVELL ASIA PTE, LTD., Singapore (SG)

(*) Notice: Subject to any disclaimer, the term of this patent is extended or adjusted under 35 U.S.C. 154(b) by 0 days.

(21) Appl. No.: 17/113,728

(22) Filed: Dec. 7, 2020

(51) Int. Cl.
| | | |
|---|---|---|
| H04B 1/10 | (2006.01) | |
| H04B 10/69 | (2013.01) | |
| H04L 25/03 | (2006.01) | |
| H04B 10/079 | (2013.01) | |

(52) U.S. Cl.
CPC ... *H04B 10/6971* (2013.01); *H04B 10/07953* (2013.01); *H04B 10/6931* (2013.01); *H04L 25/03038* (2013.01); *H04L 2025/03477* (2013.01)

(58) Field of Classification Search
CPC ............ H04B 10/6971; H04B 10/6931; H04B 10/07953; H04L 25/03038; H04L 2025/03477

USPC .................. 375/233, 349, 350; 398/26
See application file for complete search history.

(56) References Cited

U.S. PATENT DOCUMENTS

| | | | | |
|---|---|---|---|---|
| 9,036,751 | B1* | 5/2015 | Wang | H04L 25/03878 |
| | | | | 375/350 |
| 9,215,107 | B1* | 12/2015 | De Bernardinis | H04L 7/0062 |
| 10,951,318 | B2* | 3/2021 | Gopalakrishnan | H03L 7/099 |
| 2013/0243070 | A1* | 9/2013 | Ito | H04L 27/01 |
| | | | | 375/233 |
| 2013/0243107 | A1* | 9/2013 | Chmelar | H04L 7/033 |
| | | | | 375/259 |
| 2020/0091608 | A1* | 3/2020 | Alpman | H01Q 1/38 |

\* cited by examiner

*Primary Examiner* — Don N Vo

(57) ABSTRACT

The present invention is directed to communication method and techniques. In a specific embodiment, the present invention provides a receiver that interleaves data signal n-ways for n slices. Each of the n slices includes feedforward equalizer and decision feedback equalizers that are coupled to other slices. Each of the n slices also includes an analog-to-digital converter section that includes data and error slicers. There are other embodiments as well.

18 Claims, 5 Drawing Sheets

ANALOG RECEIVER EQUALIZER ARCHITECTURES FOR HIGH-SPEED WIRELINE AND OPTICAL APPLICATIONS

BACKGROUND OF THE INVENTION

The present invention is directed to communication systems and methods thereof.

Over the last few decades, the use of communication networks has exploded. In the early days of the Internet, popular applications were limited to emails, bulletin board, and mostly informational and text-based web page surfing, and the amount of data transferred was relatively small. Today, the Internet and mobile applications demand a huge amount of bandwidth for transferring photo, video, music, and other multimedia files. For example, a social network like Facebook processes more than 500 TB of data daily. With such high demands on data storage and data transfer, existing data communication systems need to be improved to address these needs.

Error detection and correction is an important aspect of data communication. For example, feedforward equalization and decision feedback equalization are useful techniques, and they have are in various conventional communication systems. Unfortunately, conventional systems and techniques have been inadequate. Therefore, new and improved error correction techniques are desired.

BRIEF SUMMARY OF THE INVENTION

The present invention is directed to communication method and techniques. In a specific embodiment, the present invention provides a receiver that interleaves data signal n-ways for n slices. Each of the n slices includes feedforward equalizer and decision feedback equalizers that are coupled to other slices. Each of the n slices also includes an analog-to-digital converter section that includes data and error slicers. There are other embodiments as well.

According to an embodiment, the present invention provides a receiver that includes an analog front end (AFE) module configured to process data signals received from a communication channel. The receiver also includes a time-interleave (TI) block configured to interleave processed data signals from the AFE module n-ways. The receiver also includes an array of n slices may include a first slice and a second slice. The array of n slices is configured to perform analog-to-digital conversion (ADC) processes and output a digital data stream. The receiver also includes a digital signal processor (DSP) coupled to the array of n slices and configured to process the digital data stream. The first slice may include a first feedforward equalizer (FFE) configured to equalize a first interleaved signal from the IT block using one or more precursor values from at least the second slice. The first slice also includes a first decision device coupled to the first FFE and configured to provide a first equalized data stream using one or more postcursor values from at least a third slice. The first slice also includes a first converter coupled to the first decision device and configured to perform a first ADC process on the first equalized data stream.

According to another embodiment, the present invention provides a signal processing circuit that includes a time-interleave (TI) block configured to interleave processed incoming data signals n-ways. The circuit also includes an array of n slices may include a first slice and a second slice, the array of n slices being configured to perform analog-to-digital conversion (ADC) processes and output a digital data stream. The first slice includes a first feedforward equalizer (FFE), which may include a first summer and configured to equalize a first interleaved signal from the TI block using one or more precursor values from at least the second slice. The first slice additionally includes a first decision device may include a first variable gain amplifier (VGA) coupled to the first FFE and configured to provide a first equalized data stream using one or more postcursor values from at least a third slice. The first slice further includes a first converter may include a first plurality of slicers and configured to perform a first ADC process on the first equalized data stream.

According to yet another embodiment, the present invention provides a method for de-skewing. The method also includes initializing skew tap values associated with n slices, which correspond to n time-interleaved data paths. The n slices may include n corresponding feedforward equalizer (FFE). The method also includes enabling timing recovery for each of n slices. The method also includes adapting the n FFEs on the n time-interleaved data paths. The method also includes removing contribution of error slicers from timing recovery loops corresponding to the n slices. The method also includes calculating one or more signal-to-noise ratio (SNR) values associated with the n time-interleaved data paths. The method also includes determining skew adjustment directions of the n slices based at least on the SNR values. The method also includes adjusting the skew tap values using at least the skew adjustment directions. The method also includes determining a stability of the SNR values. The method also includes repeating the adjustment of the skew tap values until the SNR values are settled.

It is to be appreciated that embodiments of the present invention provide many advantages over conventional techniques. Among other things, de-skew and equalization techniques according to the present invention, as implemented in various embodiments, provide improved performance and efficiency compared to existing techniques.

Embodiments of the present invention can be implemented in conjunction with existing systems and processes. For example, equalization techniques can be used in conjunction with a variety of existing systems and methods. Receiver devices and circuits according to the present invention can be manufactured using existing manufacturing systems and methods, and they can be implemented with and incorporated into a wide variety of systems and methods.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
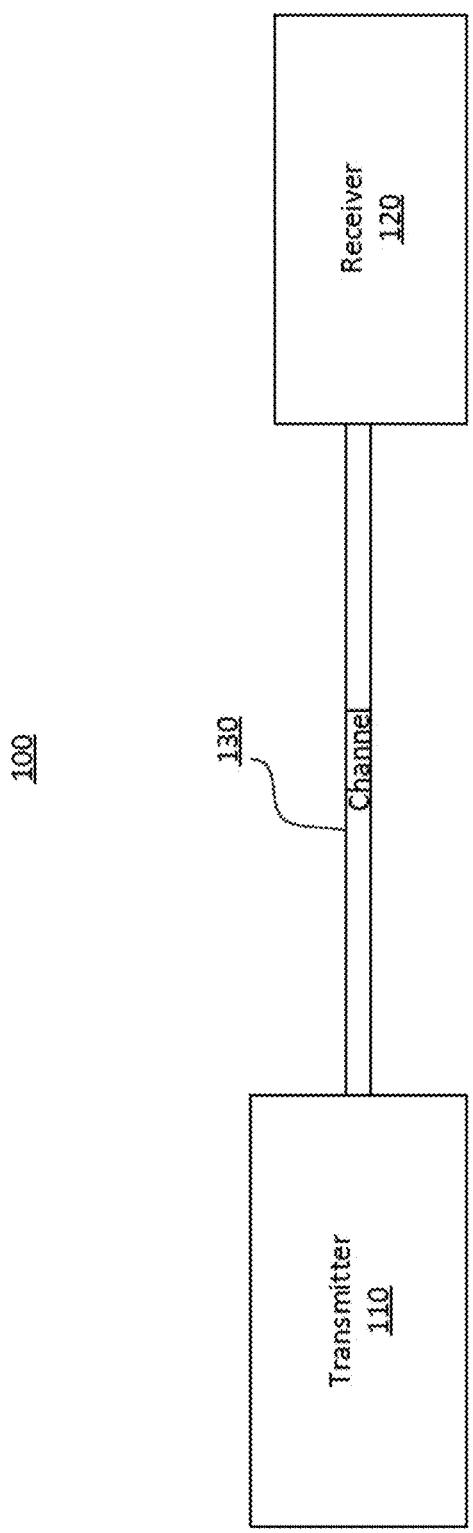
FIG. 1 is a simplified block diagram illustrating an optical communication system according to embodiments of the present invention.

The present invention is directed to communication method and techniques. In a specific embodiment, the present invention provides a receiver that interleaves data signal n-ways for n slices. Each of the n slices includes feedforward equalizer and decision feedback equalizers that are coupled to other slices. Each of the n slices also includes an analog-to-digital converter section that includes data and error slicers. There are other embodiments as well.

Signal equalization is an important aspect of data communication. For example, a receiver device includes various equalization mechanisms, as parts of its analog front end (AFE) section, to make sure that the received data signals are equalized at desired level before being converted to analog signals. According to various embodiments, the present disclosure provides receivers, such as serializer/deserializer (SerDes), that are configured with time-interleaving mechanisms coupled with FFE equalizers for pulse-amplitude-modulation (PAM)-n. For example, an equalization method according to the present invention involves adjusting and calibrating inherent clock skew that exists between the time interleaves. In a specific embodiment, the present invention provides a method that is configured to calibrate the clock-skew between different time interleaves of an analog SerDes receiver.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified block diagram illustrating an optical communication system according to embodiments of the present invention. This diagram is merely an example, which should not unduly limit the scope of the claims. One of ordinary skill in the art would recognize many variations, alternatives, and modifications. Communication system 100 includes transmitter 110 and receiver 120, which are connected via communication channel 130. For example, communication system 100 comprises an optical communication system that uses a PAM-n (e.g., PAM-4) communication protocol, and communication channel 130 is an optical communication link. In various implementations, communication system 100 is configured to perform at a high bandwidth (e.g., 25G, 100G, and even higher) using the PAM-4 communication protocol. For example, receiver 120 can be a serializer/deserializer (SerDes) receiver. Certain embodiments of the present invention provide an analog SerDes receivers configured with a time-interleaved implementation and utilize FFEs configured for PAM-n communication. In a specific embodiment, receiver 120 is configured to adjust and calibrate inherent clock skew from the time interleaves.

Figure 2:
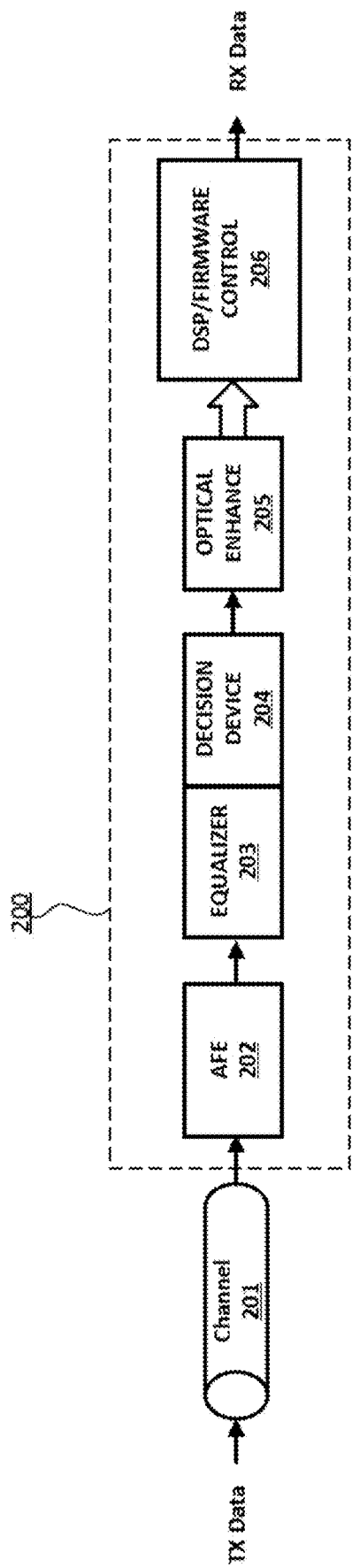
FIG. 2 is a simplified block diagram illustrating a receiver device according to embodiments of the present invention.

FIG. 2 is a simplified block diagram illustrating a receiver device according to embodiments of the present invention. This diagram is merely an example, which should not unduly limit the scope of the claims. One of ordinary skill in the art would recognize many variations, alternatives, and modifications. Receiver 200 receives incoming data (i.e., "TX Data" in FIG. 2) via communication channel 201. The incoming data are first processed at analog-front-end (AFE) block 202, which may provide various functions such as equalization and attenuation. AFE block 202 is coupled to equalizer 203 and decision device 204. For example, equalizer 203 includes feedforward equalizers (FFE) and decision feedback equalizer (DFE) that are configured in n-slices. For example, decision device block 204 and optical enhance block 205 are also configured on n slices. In various embodiments, there are 16 slices (i.e., n is 16). The output of block 205 is in a digital format (i.e., after analog-to-digital conversion is performed), and it is processed by DSP block 206, which provides "RX Data" as shown.

Figure 3:
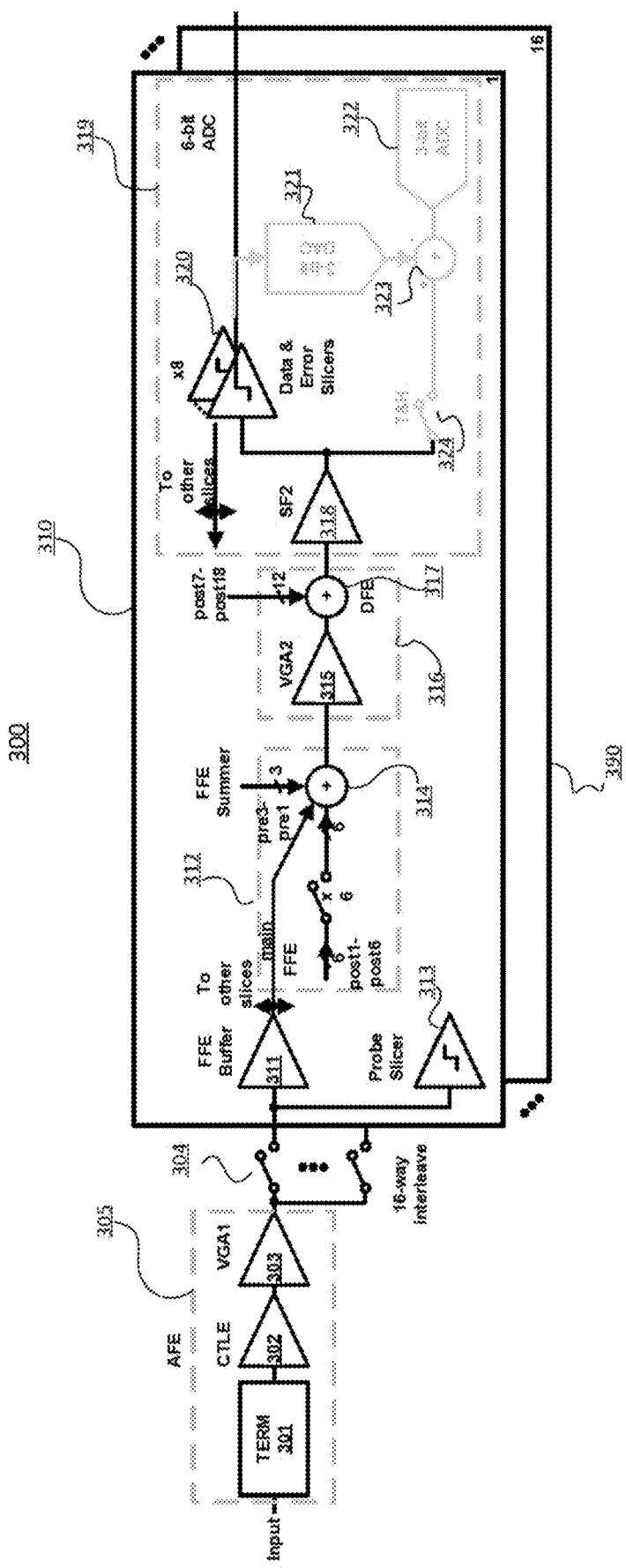
FIG. 3 is a simplified block diagram illustrating signal-processing slices according to embodiments of the present invention.

FIG. 3 is a simplified block diagram illustrating signal processing slices according to embodiments of the present invention. This diagram is merely an example, which should not unduly limit the scope of the claims. One of ordinary skill in the art would recognize many variations, alternatives, and modifications. The AFE 305 includes, as an example, a tunable termination block 301 (e.g. 50-100Ω) that is configured to minimize reflections at the interface to the input (e.g., via communication channel 201 in FIG. 2). For example, termination block 301 may include both impedance matching elements to minimize reflections and other undesirable effects. AFE block 305 is coupled to signal processing slices via a 16-way interleaver 304. AFE block 305 includes an equalizer block 302. For example, equalizer block 302 block may be modified or removed. In various embodiments, equalizer block 302 is implemented using a continuous time linear equalizer (CTLE) that is configured to provide mid and high frequency signal boost to compensate for the signal loss experienced by the transmission passing through the communication channel. Depending on the implementation, a CTLE can be implemented using an equalizer with 1-zero and 2-poles, or a more complex equalizer with 2-zeros and 3-poles. In a specific embodiment, an equalizer is configured to provide a boost of about 0-6 dB, and it can be adjusted by changing a frequency boost profile (e.g., setting the zero location and the peaking amount). The CTLE is followed by a variable gain amplifier (VGA) 303 to provide a gain of about 0-6 dB. When implemented with equalizer 302, VGA 303 operating parameters can be co-optimized with the operating parameters of the equalizer. For example, VGA 303 alone may have different operating parameters when implemented alone (i.e., different parameters may be used if the operation of equalizer 302 is taken in consideration).

The output of VGA 303 is coupled to interleaver block 304. For example, interleaver block 304 includes a time-interleaved (TI) array connecting to n slices. In a specific embodiment, n equals to 16, and it is optimized for receiver performance and power efficiency. For example, then slices include slice 310 as the first slice and slice 390 as the last slice (and 14 slices between slices 310 and 390). Each slice includes its own clock skew adjustment mechanism that is configured to optimize for variations in the delays and bandwidth of each of the samplers.

As an example, each of the N slices includes substantially the same components, but with different configurations (e.g., interconnect among the n slices). For the purpose of explaining, slice 310 is illustrated and described in details. For example, other slices share similar components and configuration as slice 310. Slice 310 includes a C-tap sampled feed-forward equalizer (FFE) 312. Slice 310 additionally includes a D-tap decision 316 that includes implemented with a decision-feedback equalizer (DFE). Slice 310 additionally includes an ADC section 319, which includes decision devices (i.e., data and error slicers at block 320). Slice 310 may additionally include an optical enhancement block. As an example, slice 310 includes probe slicer 313 that is coupled to the FFE 312.

In various embodiments, the interleaving process performed by block 304 provides the time delay (e.g., $T_s=1/56$ GHz) needed for the implementation of the sampled FFE and DFE equalizers at their respective slices. The amount of time delay ($T_s$) is configured based on the number of slices used. For instance, assuming increasing slice number means sampling further in time, from the perspective of "slice 2" [(x+2)*Ts] that is configured next to slice 310, slice 310 or "slice 1" [(x+1)*Ts] output would be the first post-cursor, slice 3 (i.e., the slice configured next to slice 2) output would be the first pre-cursor, and slice 4 (i.e., configured next to slice 3) output would be the second pre-cursor and so on. Depending on the implementation, interconnect and the cursor positions of the N slices can be configured in various ways.

As an example, FFE 312 includes of a buffer 311 that is configured to drive the long interconnect running to/from adjacent slices and a summation circuit (e.g., FFE summer 314). In various embodiments, buffer 311 is coupled to probe slicer 313. The FFE buffer 311, in various embodiments, provides some gain adjustment capability (e.g., -2 to 2 dB), which can help mitigate the gain variation between the interleave slices—a common issue in time-interleaved designs. Among other benefits, the gain adjustment afforded by FFE buffers—including buffers configured on slices not shown in FIG. 3—helps reduce the required gain range on subsequent amplifier stages and more importantly reduces the tap range requirement due to increased variability on the individual cursors of the 16 slices.

In a specific embodiment, the number of taps for the FFE is C=10, which includes 3 pre-cursors and 6 post-cursors. For example, the number of taps is defined during a system optimization process. In various embodiments, the system optimization process factors in characteristics for CTLE and DFE. For example, an objective of the system optimization process is to equalize medium-reach (MR) and long-reach (LR) channels up to 30+dB loss at Nyquist frequency. Depending on the implementation, one or more of the post-cursors of the FFE 312 may also be delayed (show in FIG. 3 as switching path, e.g., sample & hold circuit) to allow additional settling time.

Figure 4:
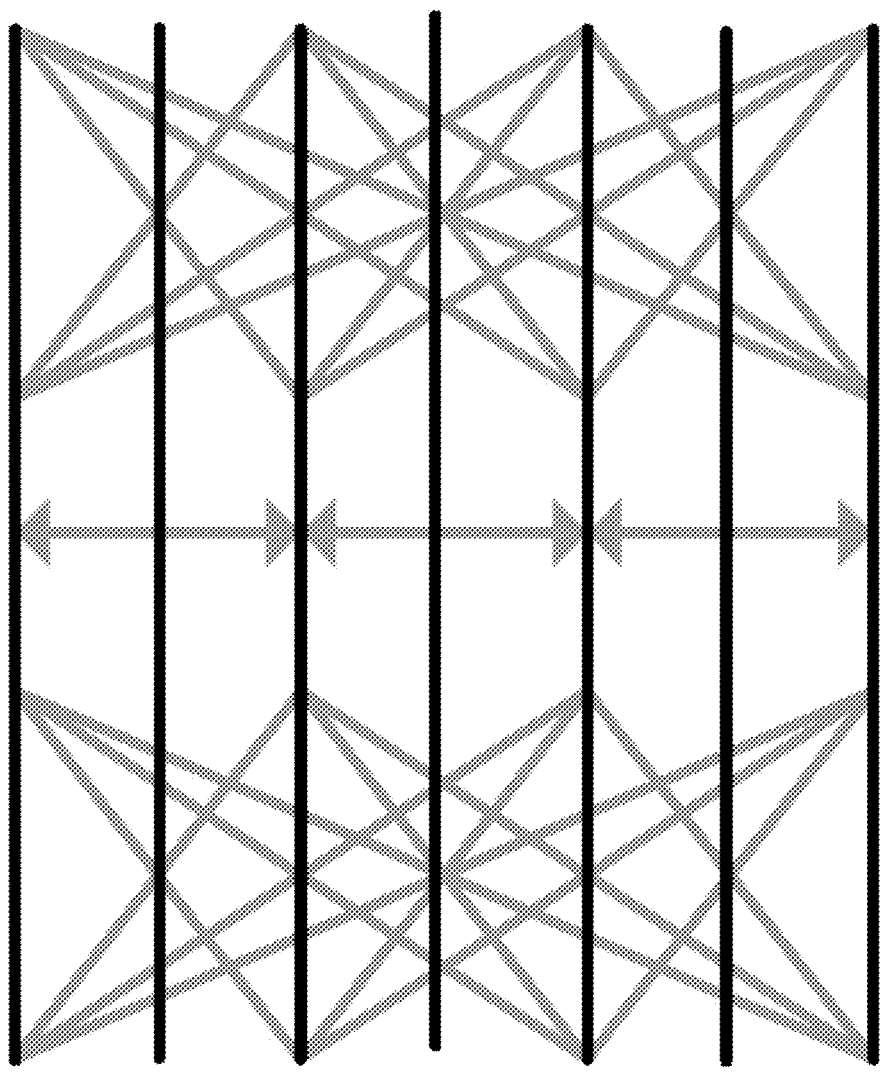
FIG. 4 is a PAM-4 graph illustrating operations of a receiver according to embodiments of the present invention.

FIG. 4 is a PAM-4 graph illustrating operations of a receiver according to embodiments of the present invention. This diagram is merely an example, which should not unduly limit the scope of the claims. One of ordinary skill in the art would recognize many variations, alternatives, and modifications. In an exemplary implantation of PAM-4 signal detection, three data slicers (-2, 0, +2) and four error slicers (+/-3, +/-1) are configured to slice at the threshold levels shown. Even though one error slicer may be sufficient in some implementations, four error slicers are used in this implementation to allow high bandwidth baud-rate timing recovery. It is to be appreciated the slicer implantation illustrated herein can speed up the adaptation of the FFE, DFE, gain, and offset loops. In a specific embodiment, when operating in the NRZ mode, only two error slicers are used, and all the data slicers are set to the same threshold to slice the center of the eye. For example, a four-error-slicer arrangement enables the addition of an optional data path for optical enhancement. In an embodiment, another slicer (not shown in FIG. 4) can be configured as a calibration slicer, which can be used to find the true amplitude of the eye and switches with one data slicer at a time (+2, 0, or -2) in a mission mode to enable background calibration of offset. For example, a patent describing related circuit operation is described in the U.S. Pat. No. 9,467,315, entitled "CIRCUIT AND METHOD FOR PERFORMING ADAPTATION ON ALL RECEIVER BRANCHES", which is incorporated by reference herein. The U.S. Pat. No. 9,660,841, entitled "CIRCUIT AND METHOD FOR PERFORMING ADAPTION ON ALL RECEIVER BRANCHES", is also incorporated by reference herein.

Now referring back to FIG. 3. In various embodiments, a PAM-4 decision device (as explained above) is configured to perform substantially similar processes to a non-uniformly quantizing 3-bit analog-to-digital converter (ADC) 321. For example, levels are uniformly spaced only in the case where there is no non-linearity in the eye, which is rare in practice. In an optical enhancement module (e.g., block 205 in FIG. 2), the device produces additional M-bits resolution (e.g., via ADC 322) to the data signal. In a specific implementation, M=3, and thus in this mode the receiver functions as a 6-bit ADC. The 6-bit information enables the single-parity forward error correction (SFEC) and optical interference mitigation (OIM) functions, as well as improving the functionality of the reflection canceller (NC) in the DSP (e.g., DSP block 206 in FIG. 2). The decision feedback of the decision feedback equalizer (DFE) 316 remains the same as before, but a 3-bit DAC 321 is configured to convert the data/error slicer outputs back to an analog value. Another path (i.e., including blocks 323 and 324) includes a sample & hold (T&H) block 324 that is configured to provide the time for the additional conversion processes. In various implementations, block 324 allows for decoupling the main 3-bit data path. This means that the receiver can be configured in a non-enhancement mode without much performance penalty. For example, the output of DAC 321 is subtracted from the hold value (stored at block 324) of the equalized signal to generate a residue value, which is quantized again. In an exemplary implementation, a final stage includes another seven slicers for 3-bits (the number of slicers can be optimized by using techniques such as interpolation); this architecture is similar to a 2-step flash/subranging ADC. For example, the additional seven slicers trigger at levels between each of the eight sub-eyes (e.g. above +3, +3 to +2+2 to +1, etc.) depending on the data slicer/error slicer decisions.

At the bring-up of receiver operation, the sixteen time-interleaved signals are collected using a derived clock and they are fed into each respective track and hold blocks of corresponding slices. This process determines the sample time for each interleave. The skew between the different slices impedes performance and limits the FFEs, as it uses the range in the FFE coefficients to undo phase delays. To maximize the SNR while not allowing for interactions between the timing recovery and FFE, embodiments of the present invention provides an algorithm that decouples FFE processes from the clock timing recovery. For example, the DSP (e.g., block 206 in FIG. 2) is configured to turn off the contribution of each of the interleaves to the timing recovery loop using a binary control register (e.g., a "q[15:0]" in a specific embodiment). Each individual bit in the register controls the contribution coming from the corresponding interleave/slice (e.g., q[15:0] provides 16 switches on/off switches for 16 slices). In various embodiments, receivers are configured to control the skew on each of the slices, R steps are provided for the skew (where R=64 in a specific embodiment), and each step is in the range of 150 to 250 femtoseconds. At the bring-up process, the control is centered at the midpoint on all slices. To prevent the N FFEs from interacting with the timing recovery, an FFE adaptation mechanism restricts the first precursor, the first postcursor, or a combination thereof.

Figure 5:
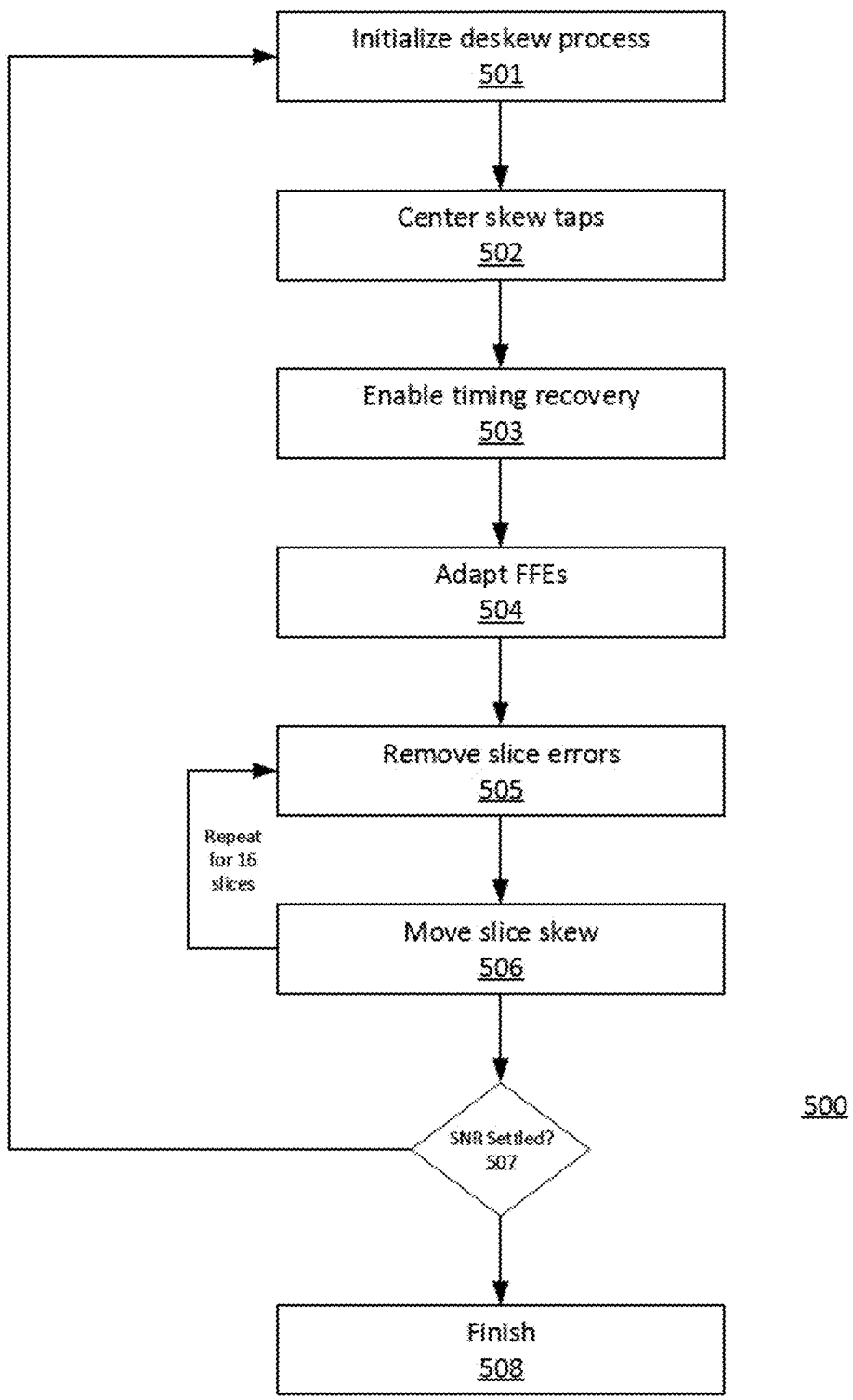
FIG. 5 is a simplified flow diagram illustrating a de-skewing process according to embodiments of the present invention.

FIG. 5 is a simplified flow diagram illustrating a deskewing process according to embodiments of the present invention. This diagram is merely an example, which should not unduly limit the scope of the claims. One of ordinary skill in the art would recognize many variations, alternatives, and modifications. For example, one or more steps may be added, removed, repeated, modified, rearranged, or replaced, and they should not limit the scope of the claims.

At step 501, the deskew process 500 is initialized. For example, initialization process includes bringing up various hardware modules and initialize their operating parameters. At step 502, skew taps are centered at the respective midpoints of interleaved slices (e.g., n interleaved slices, n=0, 1, 2, . . . 15, and for a 64 steps implementation, R[n]=R_center=32). Timing recovery is enabled at step 503. For example, using register q[15:0] as explained above, enable the timing recovery on all slices is accomplished by setting q[15:0] to "1". FFEs on the N paths are adapted independently, at step 504. Slicer error are removed at step 505. In various embodiments, removing slicer errors involves removing the contribution of the error slicer from the timing recovery loop using the register by setting the corresponding location to a binary value of "0" while setting all the other locations to a binary value of "1". Additionally, signal-to-noise ratio (SNR) is calculated at the current point (e.g., variable SNR_MID). At step 506, slice skews are moved. For example, to move the skew of the current slice to the right, the step variable R is set to R_right=R[slice_idx]+1, and the SNR of the current point (e.g., variable SNR_RIGHT) is calculated; to move the the skew of the current slice to the left, the step variable R is set to R_left=R[slice_idx]−1, and the SNR of the current point (e.g., variable SNR_LEFT) is calculated. Depending on the values of SNR_RIGHT and SNR_LEFT relative to SNR_MID, the follow operations are performed:
    if (SNR_RIGHT>SNR_MID)
        R[slice_idx]=R_right
    if (SNR_LEFT>SNR_MID)
        R[slice_idx]=R_left Steps 505 are 506 are performed for each of the n slices (e.g., n is 16 in an exemplary embodiment). Step 507 determines whether the SNR value has been settled or reached a predetermined level. If so, the deskew process 500 is complete and proceeds to step 508. On the other hand, if the SNR value, as determined in step 507, is not settled, one or more steps in may be repeated. For example, FIG. 5 shows going from step 507 to step 501, thereby repeating steps 501-506, but it is understood that other steps may be repeated as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A receiver comprising:
an analog front end (AFE) circuit configured to process data signals received from a communication channel;
a time-interleave (TI) block configured to interleave processed data signals from the AFE circuit n-ways;
an array of n slices comprising a first slice and a second slice, the array of n slices being configured to perform analog-to-digital conversion (ADC) processes and output a digital data stream; and
a digital signal processor (DSP) coupled to the array of n slices and configured to process the digital data stream;
wherein the first slice comprises:
a first feedforward equalizer (FFE) configured to equalize a first interleaved signal from the TI block using one or more precursor values from at least the second slice;
a first decision device coupled to the first FFE and configured to provide a first equalized data stream using one or more postcursor values from at least a third slice; and
a first converter coupled to the first decision device and configured to perform a first ADC process on the first equalized data stream.

2. The receiver of claim 1 wherein the first converter comprises a first data path and a second data path, the first data path comprising data and error slicers, the second data path comprising a sample-and-hold block.

3. The receiver of claim 2 wherein the first converter further comprises a digital-to-analog converter (DAC) coupled to the data and error slicers.

4. The receiver of claim 1 wherein the first slice further comprising a first FFE buffer.

5. The receiver of claim 1 wherein the first slice further comprising a probe slicer.

6. The receiver of claim 1 wherein the first decision device comprises a variable gain amplifier and a decision feedback equalizer (DFE) coupled to at least the second slice.

7. The receiver of claim 1 wherein the first FFE comprises a summer configured to add the one or more precursor values from at least the second slice to one or more post cursor values.

8. The receiver of claim 1 wherein the AFE circuit comprises:
   a termination block;
   a continuous time linear equalizer; and
   a variable gain amplifier.

9. The receiver of claim 1 wherein the DSP is configured to provide reflection cancelation.

10. The receiver of claim 1 wherein the DSP is configured to perform a single-parity forward error correction (SFEC) function.

11. The receiver of claim 1 wherein the DSP is configured to perform an optical interference mitigation (OIM) function.

12. The receiver of claim 1 wherein the second slice comprises:
   an equalizer section;
   a decision device; and
   an optical enhancement section.

13. A signal processing circuit comprising:
   a time-interleave (TI) block configured to interleave processed incoming data signals n-ways; and
   an array of n slices comprising a first slice and a second slice, the array of n slices being configured to perform analog-to-digital conversion (ADC) processes and output a digital data stream, the first slice comprising:
      a first feedforward equalizer (FFE) comprising a first summer and configured to equalize a first interleaved signal from the TI block using one or more precursor values from at least the second slice;
      a first decision device comprising a first variable gain amplifier (VGA) coupled to the first FFE and configured to provide a first equalized data stream using one or more postcursor values from at least a third slice; and
      a first converter comprising a first plurality of slicers and configured to perform a first ADC process on the first equalized data stream.

14. The signal processing circuit of claim 13 wherein the first plurality of slicers comprises a first probe slicer.

15. The signal processing circuit of claim 13 wherein the first decision device comprises a second summer coupled to a fourth slice.

16. The signal processing circuit of claim 13 wherein the first plurality of slicers comprises data slicers and error slicers.

17. The signal processing circuit of claim 13 wherein the first converter comprises a first path and a second path, the first path comprising the first plurality of slicers and the second path comprising a hold buffer.

18. The signal processing circuit of claim 13 wherein:
   n is 16; and
   the incoming data signals are associated with a PAM-4 protocol.

* * * * *